(12) United States Patent
Taylor et al.

(10) Patent No.: US 11,323,473 B2
(45) Date of Patent: May 3, 2022

(54) NETWORK THREAT PREVENTION AND INFORMATION SECURITY USING MACHINE LEARNING

(71) Applicant: Bank of America Corporation, Charlotte, NC (US)

(72) Inventors: Jo-Ann Taylor, Godalming (GB); Benjamin F. Tweel, Romeoville, IL (US); Michael R. Young, Davidson, NC (US); Michael J. Sbandi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 356 days.

(21) Appl. No.: 16/779,243

(22) Filed: Jan. 31, 2020

(65) Prior Publication Data
US 2021/0243204 A1    Aug. 5, 2021

(51) Int. Cl.
*H04L 9/40*    (2022.01)
*H04L 29/06*    (2006.01)

(52) U.S. Cl.
CPC ........ *H04L 63/145* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 7,483,972 B2 | 1/2009 | Bhattacharya et al. |
| 7,519,998 B2 | 4/2009 | Cai et al. |
| 7,526,806 B2 | 4/2009 | Wiley et al. |
| 7,603,709 B2 | 10/2009 | Lewis et al. |
| 7,607,041 B2 | 10/2009 | Kraemer et al. |
| 7,779,471 B2 | 8/2010 | Balasubramaniyan et al. |
| 7,784,099 B2 | 8/2010 | Benjamin |
| 7,854,002 B2 | 12/2010 | Mohanan et al. |
| 8,028,160 B1 | 9/2011 | Orr |

(Continued)

FOREIGN PATENT DOCUMENTS

| | | |
|---|---|---|
| EP | 2890079 A1 | 7/2015 |
| EP | 3053084 A1 | 8/2016 |

(Continued)

*Primary Examiner* — Joseph P Hirl
*Assistant Examiner* — Hassan Saadoun (57) ABSTRACT

An information security system that includes an information security engine configured to detect an attack by a malicious software element in a network. The information security engine is further configured to transfer the malicious software element from the network to the emulated network in response to detecting an attack. The information security engine is further configured to select defense strategies for restricting communications using different port configurations and to implement each defense strategy within the emulated network. The information security engine is further configured to execute a duplicate of the malicious software element in the emulated network and to determine a performance level for each of the defense strategies against the duplicate of the malicious software element. The information security engine is further configured to select a defense strategy with a highest performance level and to implement the selected defense strategy within the network.

20 Claims, 4 Drawing Sheets

(56) References Cited

U.S. PATENT DOCUMENTS

| | | | |
|---|---|---|---|
| 8,230,498 B2 | 7/2012 | Shaffer et al. | |
| 8,261,355 B2 | 9/2012 | Rayes et al. | |
| 8,438,644 B2 | 5/2013 | Watters et al. | |
| 8,488,488 B1 | 7/2013 | Hermanns et al. | |
| 8,504,876 B2 | 8/2013 | Mork et al. | |
| 8,997,224 B1* | 3/2015 | Lu | H04L 63/1441 726/22 |
| 9,141,805 B2 | 9/2015 | Giakouminakis et al. | |
| 9,177,157 B2 | 11/2015 | Binder | |
| 9,398,035 B2 | 7/2016 | Vasseur et al. | |
| 9,413,779 B2 | 8/2016 | Vasseur et al. | |
| 9,419,996 B2 | 8/2016 | Porat et al. | |
| 9,641,542 B2 | 5/2017 | Vasseur et al. | |
| 9,690,933 B1 | 6/2017 | Singh et al. | |
| 9,838,409 B2 | 12/2017 | Flacher et al. | |
| 10,038,713 B2 | 7/2018 | Vasseur et al. | |
| 10,063,575 B2 | 8/2018 | Vasseur et al. | |
| 10,063,578 B2 | 8/2018 | Flacher et al. | |
| 10,078,752 B2 | 9/2018 | Berg et al. | |
| 10,114,954 B1 | 10/2018 | Bellis et al. | |
| 10,122,743 B2 | 11/2018 | Ridley | |
| 10,169,135 B1 | 1/2019 | Pandey et al. | |
| 10,193,913 B2 | 1/2019 | Machlica et al. | |
| 10,320,824 B2 | 6/2019 | Vasseur et al. | |
| 2008/0172382 A1 | 7/2008 | Prettejohn | |
| 2008/0270601 A1 | 10/2008 | Ishikawa | |
| 2009/0013405 A1 | 1/2009 | Schipka | |
| 2012/0023572 A1* | 1/2012 | Williams, Jr. | H04L 63/1425 726/13 |
| 2012/0210422 A1 | 8/2012 | Friedrichs et al. | |
| 2013/0305357 A1 | 11/2013 | Ayyagari et al. | |
| 2013/0326625 A1 | 12/2013 | Anderson et al. | |
| 2014/0115706 A1* | 4/2014 | Silva | G06F 9/45533 726/23 |
| 2015/0195145 A1 | 7/2015 | Di Pietro et al. | |
| 2016/0234236 A1* | 8/2016 | Silva | H04L 63/1425 |
| 2017/0195353 A1* | 7/2017 | Taylor | H04L 67/2842 |
| 2018/0004958 A1 | 1/2018 | Reinecke et al. | |
| 2018/0046811 A1* | 2/2018 | Andriani | G06F 21/577 |
| 2018/0060159 A1 | 3/2018 | Justin et al. | |
| 2018/0083999 A1 | 3/2018 | Cherian | |
| 2018/0159871 A1 | 6/2018 | Komashinskiy et al. | |
| 2018/0159895 A1* | 6/2018 | Ma | H04L 69/163 |
| 2018/0198821 A1* | 7/2018 | Gopalakrishna | H04L 63/145 |
| 2018/0219887 A1 | 8/2018 | Luo et al. | |
| 2019/0018960 A1 | 1/2019 | Chistyakov et al. | |
| 2019/0219887 A1 | 7/2019 | Casset et al. | |
| 2021/0099476 A1* | 4/2021 | Montgomery | H04L 63/02 |

FOREIGN PATENT DOCUMENTS

| | | |
|---|---|---|
| EP | 3092742 A1 | 11/2016 |
| WO | 2005011195 A2 | 2/2005 |
| WO | 2012168898 A1 | 12/2012 |

* cited by examiner

NETWORK THREAT PREVENTION AND INFORMATION SECURITY USING MACHINE LEARNING

TECHNICAL FIELD

The present disclosure relates generally to information security, and more specifically to network threat prevention and information security using machine learning.

BACKGROUND

Many computer systems have expansive networks that include a large number of network devices. These computer systems allow data to be shared among the different network devices. One of the technical challenges that occur in a computer system is controlling unauthorized access to data and data exfiltration. For example, a bad actor may employ malware to extract and exfiltrate data from a network. Existing threat detection systems rely on searching for known malware signatures (e.g. file names or code) to detect the presence of malware. Over time, a bad actor may continue to evolve malware such that its signature changes and becomes more difficult to detect. This poses a technical challenge for detecting the presence of malware and for providing information security.

SUMMARY

Many computer systems have expansive networks that include a large number of network devices. These computer systems allow data to be shared among the different network devices. One of the technical challenges that occur in a computer system is controlling unauthorized access to data and data exfiltration. For example, a bad actor may employ malware to extract and exfiltrate data from a network. Existing threat detection systems rely on searching for known malware signatures (e.g. file names or code) to detect the presence of malware. Over time, a bad actor may continue to evolve malware such that its signature changes and becomes more difficult to detect. This poses a technical challenge for detecting the presence of malware and for providing information security.

Once malware is downloaded by the computer system, the malware can overload computing resources by running unauthorized programs and scripts on the system. In addition, malware can cause problems such as disruptions to computer operations, data exfiltration, unauthorized access to system resources, slower processing speeds, connectivity issues, and frequent freezing or crashing. While computing resources are occupied by malware, the computer system has less processing resources and memory to perform other operations. This results in reduced performance of the system. Malware may also reduce the network bandwidth of the computer system by making unauthorized downloads or exfiltrating data from the computer system. Reducing the network bandwidth of the computer system limits the system's ability to send and receive data which degrades the throughput of the system.

The system disclosed in the present application provides a technical solution to the technical problems discussed above by using machine learning to detect the presence of malware in a computer network. The disclosed system provides several practical applications and technical advantages which include: 1) a process for detecting malware that uses machine learning for performing network attacks; 2) a process for isolating malware from network resources and collecting behavior characteristics for the malware; 3) a process for using machine learning to improve information security of the network based on observed behavior characteristics of malware; and 4) a process for testing multiple defense strategies against a malicious software element within an emulated network before implementing a defense strategy within a live network.

In one embodiment, an information security system is configured to detect network attacks and machine learning types of network attacks that are performed by a malicious software element (e.g. malware) within a network. Machine learning types of network attacks are attacks where a malicious software element changes or adapts its attack approach based on how the network responds to an attack. For instance, a malicious software element may perform a data exfiltration type attack to extract data from the network and to transmit the extracted data to an unauthorized device that is located outside of the network. As an example, a machine learning type of attack may involve adjusting data transfer file sizes when attempting to exfiltrate data from the network. In this example, a malicious software element may first attempt to extract a particular amount of data from the network. The network may be configured to block any data transmissions that exceed a predefined data transfer limit. In the event that the malicious software element's first attempt is blocked, the malicious software element may attempt to extract and transmit progressively smaller amounts of data from the network until it is able to successfully exfiltrate data from the network.

The information security system is further configured to isolate a malicious software element within an emulated network and to document the behavior of the malicious software element in an attack log. Here, the information security system relocates the malicious software element to a safe location where the behavior of the malicious software element can be observed and documented. The attack log comprises information about the behavior characteristics of a malicious software element. The information security system is further configured to train a machine learning model to detect and terminate future machine learning types of attacks based on the information in the attack log. This process allows the information security system to learn new behavior patterns for attacks on the network and to improve information security defenses based on the learned behavior patterns.

The information security system is further configured to determine a defense strategy that can be implemented in a network for dealing with a detected malicious software element by first testing multiple defense strategies within an emulated network. The defense strategy is a network configuration for preventing or mitigating attacks to the network by the malicious software element and similar malicious software elements. The emulated network is configured to mirror data traffic from a live network while testing the performance of a defense strategy. This process allows the information security system to test the performance of a defense strategy against the malicious software element using copies of actual data traffic from the network. Using copies of actual data traffic from the network provides a more accurate representation of how well the defense strategy performs compared to using an approach that uses a generic set of test data.

The information security system is further configured to generate copies of a malicious software element for testing various defense strategies. By using copies of the malicious software element, the information security system is able to maintain the integrity of the original malicious software element for other tests and analyses. In addition, by using copies of the malicious software element the information security system is able to employ parallelism to test multiple defense strategies at the same time. For example, the information security system may employ multiple processors or multiple devices that are each configured to test a different defense strategy against a copy of the malicious software element. This approach reduces the amount of time required to test multiple defense strategies which allows the information security system to respond faster to network attacks, and thereby, improves the operation of the overall system.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Information Security System

Figure 1:
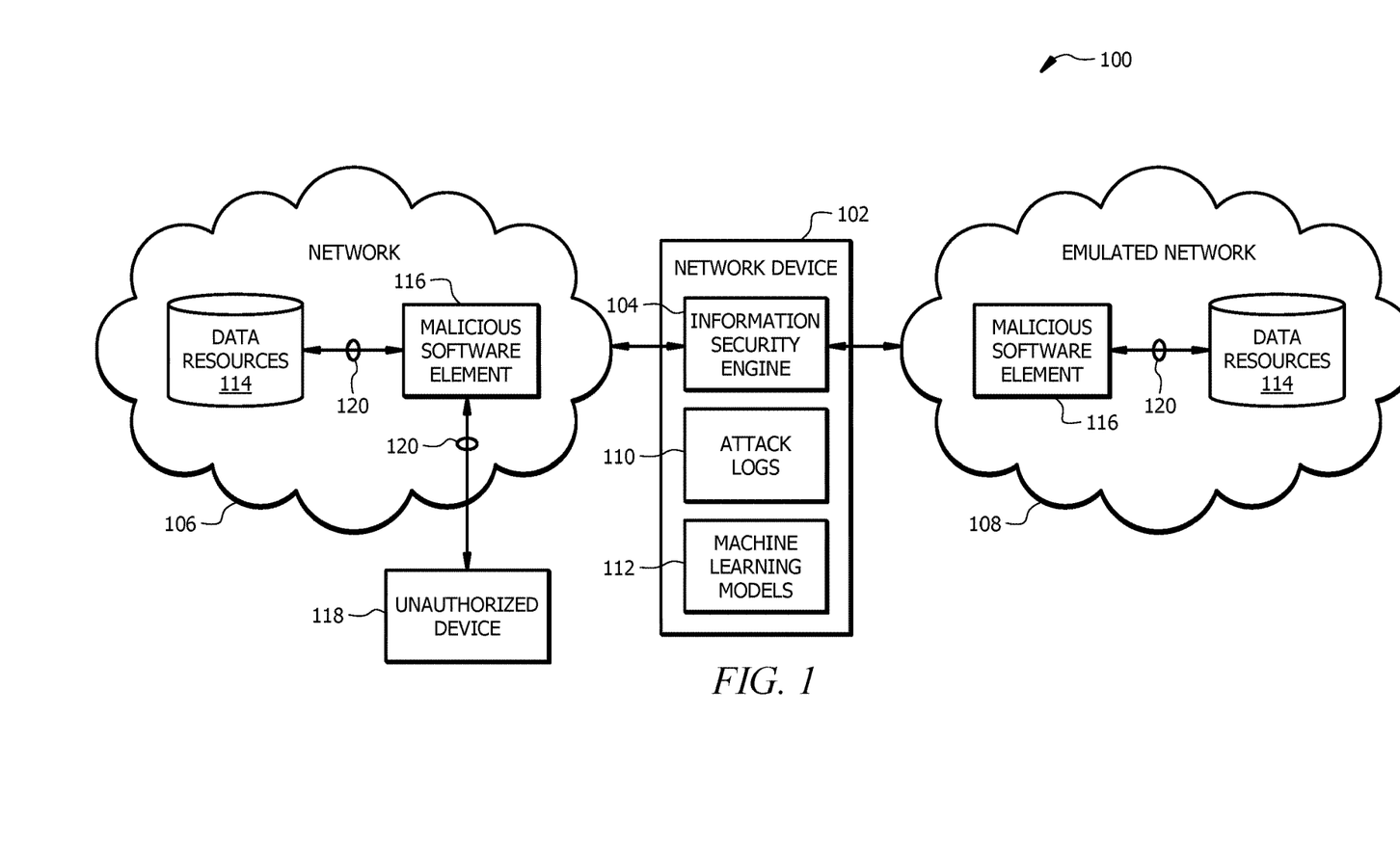
FIG. 1 is a schematic diagram of an information security system configured to employ machine learning.

FIG. 1 is a schematic diagram of an information security system 100 configured to employ machine learning to detect attacks performed by malicious software elements 116 and to train a machine learning model 112 to detect and prevent future attacks. In one embodiment, the information security system 100 comprises a network device 102 that is in signal communication with devices in a network 106 and devices in an emulated network 108. The information security system 100 may be configured as shown or in any other suitable configuration.

Network Device with Information Security Engine

In one embodiment, the network device 102 comprises an information security engine 104, attack logs 110, and machine learning models 112. The network device 102 is in signal communication with devices in the network 106 and the devices in the emulated network 108 using one or more network connections. The network device 102 may employ any suitable type of network connection and/or communication protocol as would be appreciated by one of ordinary skill in the art. In one embodiment, the network device 102 is a member of the network 106. Additional information about the hardware configuration of the network device 102 is described in FIG. 4.

The information security engine 104 is generally configured to detect network attacks and machine learning types of network attacks that are performed by a malicious software element 116 within the network 106. Malicious software elements 116 may be code, instructions, scripts, or applications that are installed or executed onto a compromised device within the network 106. For example, a bad actor may install a malicious software element 116 on a device within the network 106 so that data 120 can be exfiltrated from the network 106. Examples of malicious software elements 116 include, but are not limited to, viruses, malware, worms, spyware, ransomware, trojans, key loggers, or any other type of malicious software.

Machine learning types of network attacks are attacks where a malicious software element 116 changes or adapts its attack approach based on how the network 106 responds to an attack. For instance, a malicious software element 116 may perform a data exfiltration type attack to extract data 120 from one or more data resources 114 of the network 106 and to transmit the extracted data 120 to an unauthorized device 118 that is located outside of the network 106. Examples of unauthorized devices 118 may include but are not limited to, mobile devices (e.g. smart phones or tablets), computers, laptops, or any other type of device. As an example, a machine learning type of attack may involve adjusting data transfer file sizes when attempting to exfiltrate data 120 from the network 106. In this example, a malicious software element 116 may first attempt to extract a particular amount of data 120 from the network 106. The network 106, for example, the information security engine 104, may be configured to block any data transmissions that exceed a predefined data transfer limit. In the event that the malicious software element's 116 first attempt is blocked, the malicious software element 116 may attempt to extract and transmit progressively smaller amounts of data 120 from the network 106 until it is able to successfully exfiltrate data 120 from the network 106.

As another example, a machine learning type of attack may involve changing ports when attempting to exfiltrate data 120 from the network 106. In this example, a malicious software element 116 may attempt to extract data 120 from the network 106 using a first port. The network 106, for example the information security engine 104, may be configured to block outgoing data transmissions from particular ports. In the event that the malicious software element's 116 first attempt is blocked, the malicious software element 116 may attempt to send extracted data 120 using other ports until it is able to successfully exfiltrate data 120 from the network 106. In other examples, a malicious software element 116 may adjust or change any other parameters when attempting to exfiltrate data 120 from the network 106.

The information security engine 104 is further configured to isolate a malicious software element 116 within the emulated network 108 and to document the behavior of the malicious software element 116 in an attack log 110. Here, the information security engine 104 relocates the malicious software element 116 to a safe location (i.e. the emulated network 108) where the behavior of the malicious software element 116 can be observed and documented. The attack log 110 comprises information about the behavior characteristics of a malicious software element 116. For example, the attack log 110 may comprise an identifier for a malicious software element 116, information about where the malicious software element 116 came from, information about devices or locations the malicious software element 116 is communicating with, information about data resources 114 that are affected by an attack, information about attack techniques used by the malicious software element 116, data transmission file sizes, information about ports used, or any other suitable type of information associated with an attack.

The information security engine 104 is further configured to train a machine learning model 112 to detect and terminate future machine learning types of attacks based on the information in the attack log 110. Examples of the machine learning model 112 include, but are not limited to, multilayer perceptron or any other suitable type of neural network model. For example, the machine learning model 112 may comprise an input layer, one or more hidden layers, and an output layer. This process allows the information security engine 104 to learn new behavior patterns for attacks on the network 106 and to improve information security defenses based on the learned behavior patterns. An example of the information security engine 104 implementing this process is described in FIG. 2.

The information security engine 104 is further configured to determine a defense strategy 414 for dealing with a detected malicious software element 116 that can be implemented in the network 106. The defense strategy 414 is a network configuration for preventing or mitigating attacks to the network 106 by the malicious software element 116 and similar malicious software elements 116. An example of the information security engine 104 implementing this process is described in FIG. 3.

Network

The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

The network 106 comprises one or more data resources 114 that are configured to store data for the network 106. Examples of data resources 114 include, but are not limited to, a data store, a server, a network attached storage (NAS) device, a computing device, a shared folder, a memory, or any other suitable type of network device. The network 106 may further comprise any other suitable type or combination of network devices, for example servers, routers, or computers.

Emulated Network

The emulated network 108 is generally configured to provide an environment where a malicious software element 116 can be observed without compromising the network 106 or information stored within the network 106. The emulated network 108 is configured to emulate the network 106 by replicating portions of the network 106. For example, the emulated network 108 may comprise copies of the network devices and the data resources 114 from the network 106. The copies of the data resources 114 in the emulated network 108 are configured such that any data changes do not affect the original data 120 in a data resource 114 in the network 106. In one embodiment, the emulated network 108 may be embedded within a portion of the network 106. For example, a portion of the network 106 may be allocated as the emulated network 108. In other embodiments, the emulated network 108 may be a separate network that is independent from the network 106.

In some embodiments, the emulated network 108 may be configured to mirror data traffic from the network 106. For example, the information security engine 104 may mirror the network traffic within the network 106 by copying the network traffic that is currently being transmitted within the network 106 and then transmits a copy of the network traffic within the emulated network 108.

Information Security Process

Figure 2:
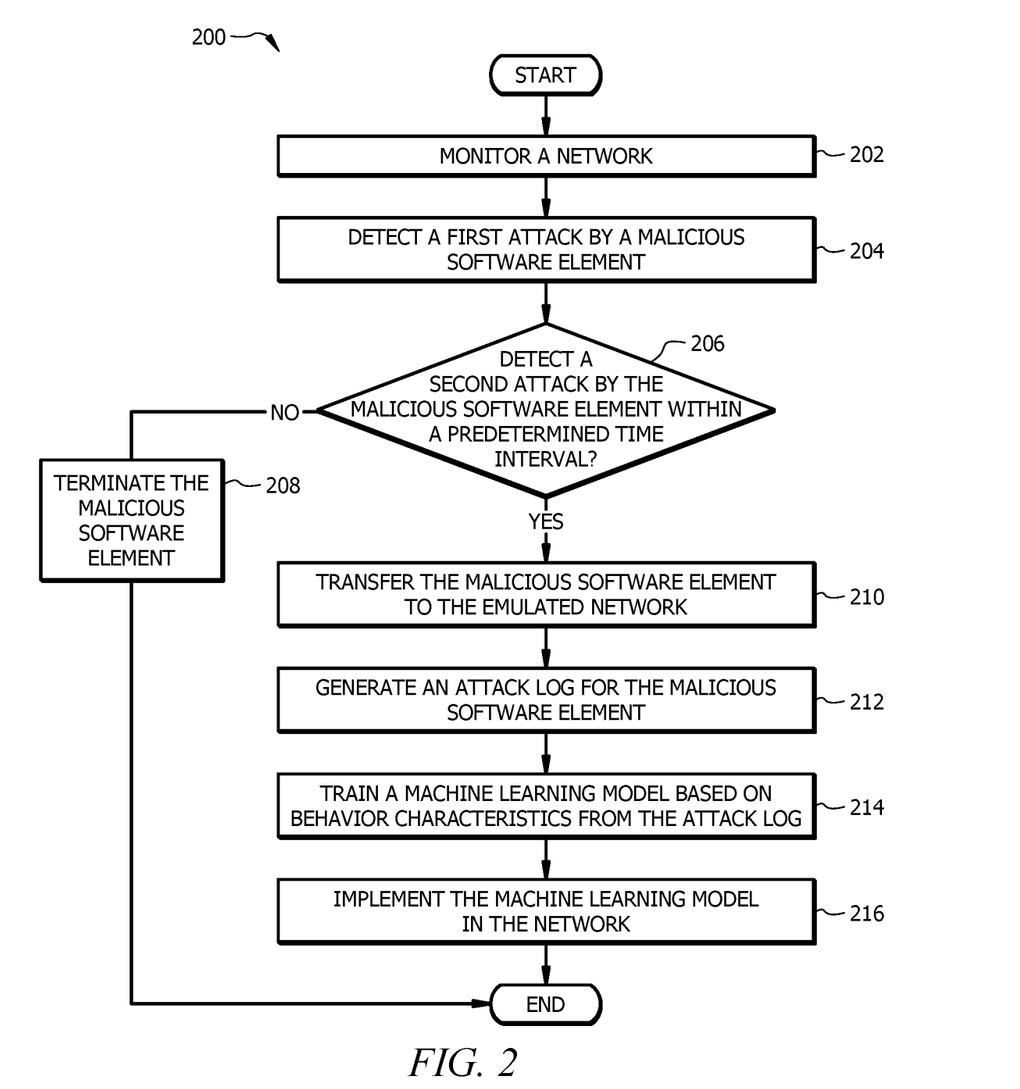
FIG. 2 is a flowchart of an embodiment of a threat detection method.

FIG. 2 is a flowchart of an embodiment of a threat detection method 200. Method 200 may be employed by the information security engine 104 of the network device 102 to detect attacks performed by malicious software elements 116 and to train a machine learning model 112 to detected and prevent future attacks. This process allows the information security engine 104 to learn new behavior patterns for attacks on the network 106 and to improve information security defenses based on the learned behavior patterns.

At step 202, the information security engine 104 monitors the network 106. Here, the information security engine 104 monitors data transmissions by devices within the network 106. For example, the information security engine 104 may monitor when data 120 is extracted from a data resource 114 and any attempts to transmit the data 120 to devices outside of the network 106.

At step 204, the information security engine 104 detects a first attack by a malicious software element 116. As an example, the information security engine 104 may detect a first attack that attempts to transmit a first portion of data 120 from a data resource 114 in the network 106 to an unauthorized device 118 that is located outside of the network 106. In this example, the first attack may attempt to transmit a file size that exceeds a predefined limit for outgoing data transfers. As another example, the information security engine 104 may detect a first attack that attempts to transmit data 120 from a data resource 114 to an unauthorized device 118 that is located outside of the network 106 using a first port. In this example, the first attack may attempt to transmit the data 120 using a port that is blocked for outgoing data transfers. The information security engine 104 may block the data transmission attempt in response to detecting the first attack.

At step 206, the information security engine 104 determines whether another attack has been detected for the malicious software element 116 within a predetermined time interval from the first attack. The predetermined time interval may be set to five milliseconds, one second, one minute, five minutes, one hour, or any suitable time interval. In one embodiment, the information security engine 104 may set a timer that can be used to determine whether another attack from the malicious software element 116 has been detected within the predetermined time interval.

The information security engine 104 proceeds to step 208 in response to determining that another attack was not detected for the malicious software element 116 within the predetermined time interval. At step 208, the information security engine 104 terminates the malicious software element 116. Here, the information security engine 104 may determine that the malicious software element 116 is not configured to implement a machine learning type of attack. This means that the malicious software element 116 will not likely change or adapt its attack approach over time and the information security engine 104 may not learn any new behavior patterns by further observing the malicious software element 116. In this case, the information security engine 104 may terminate or disable the malicious software element 116 using any suitable technique as would be appreciated by one of ordinary skill in the art. For example, the information security engine 104 may delete the malicious software element 116.

Returning to step 206, the information security engine 104 proceeds to step 210 in response to determining that another attack was detected for the malicious software element 116 within the predetermined time interval. As an example, the information security engine 104 may detect a second attack within the predetermined time interval that attempts to transmit a second portion of data 120 from the data resource 114 in the network 106 to the unauthorized device 118 that is located outside of the network 106. In this example, the second portion of data 120 may have a smaller file size than the first portion of data 120 that was previously attempted. The second attack may also attempt to transmit a file size that exceeds a predefined limit for outgoing data transfers. As another example, the information security engine 104 may detect a second attack within the predetermined time interval that attempts to transmit data 120 from the data resource 114 in the network 106 to the unauthorized device 118 that is located outside of the network 106 using another port that is blocked for outgoing data transmissions. In one embodiment, the information security engine 104 is configured to block any data transmission attempts in response to detecting another attack.

At step 210, the information security engine 104 transfers the malicious software element 116 to the emulated network 108. Here, the information security engine 104 may extract and relocate the code or files associated with the malicious software element 116 to the emulated network 108. Relocating the malicious software element 116 to a safe location (i.e. the emulated network 108) allows the behavior of the malicious software element 116 to be observed and documented without compromising the security of the network 106.

At step 212, the information security engine 104 generates an attack log 110 for the malicious software element 116. The attack log 110 may comprise information about the behavior characteristics of a malicious software element 116. For example, the attack log 110 may comprise an identifier for a malicious software element 116, information about where the malicious software element 116 came from, information about devices or locations the malicious software element 116 is communicating with, information about data resources 114 that are affected by an attack, information about attack techniques used by the malicious software element 116, information about data resources 114 that are affected by an attack, an attack-type (e.g. data exfiltration, changing data transmission file sizes, or changing ports), data transmission file sizes, information about ports used, or any other suitable type of information associated with an attack or technique used by the malicious software element 116. In one embodiment, the information security engine 104 is configured to collect behavior characteristics for the malicious software element 116 over a predetermined time period and to terminate or disable the malicious software element 116 after the predetermined time period has elapsed.

At step 214, the information security engine 104 trains a machine learning model 112 based on behavior characteristics from the attack log 110. In one embodiment, the machine learning model 112 is configured to receive behavior characteristics of the malicious software element 116 and to output a threat response 412 based on the behavior characteristics of the malicious software element 116. The threat response 412 may comprise instructions or actions to perform on the malicious software element 116. Examples of actions may include, but are not limited to, terminating the malicious software element 116, isolating the malicious software element 116, ignoring the malicious software element 116, or performing any other suitable type of action on the malicious software element 116.

In another embodiment, the machine learning model 112 is configured to receive behavior characteristics of the malicious software element 116 and to output a threat signature 410 based on the behavior characteristics of the malicious software element 116. The threat signature 410 may comprise information for identifying malicious software elements 116. For example, a threat signature 410 may comprise code, filenames, or any suitable type of identifier for a malicious software element 116. In other embodiments, the machine learning model 112 may be configured to generate any other suitable type of output based on the behavior characteristics of the malicious software element 116.

At step 216, the information security engine 104 implements the machine learning model 112 in the network 106. Implementing the machine learning model 112 in the network 106 allows the information security engine 104 to detect other malicious software elements 116 and to prevent or mitigate any future network attacks. For example, the information security engine 104 may monitor the network 106 to identify behavior characteristics for a second software element. The information security engine 104 may input the behavior characteristics for the second software element into the machine learning model 112 to obtain a threat response 412 for the second software element. In the event that the second software element is determined to be a malicious software element 116, the information security engine 104 may perform any actions indicated by the threat response 412 for the second software element.

As another example, the information security engine 104 may input the behavior characteristics for the second software element into the machine learning model 112 to obtain a threat signature 410. The information security engine 104 may determine whether the threat signature 410 for the second software element matches a threat signature 410 for a malicious software element 116. In response to determining that the threat signature 410 for the second software element matches a threat signature 410 for a malicious software element 116, the information security engine 104 may determine that the second software element is a malicious software element 116 and may terminate or isolate the second software element.

Network Threat Prevention Process

Figure 3:
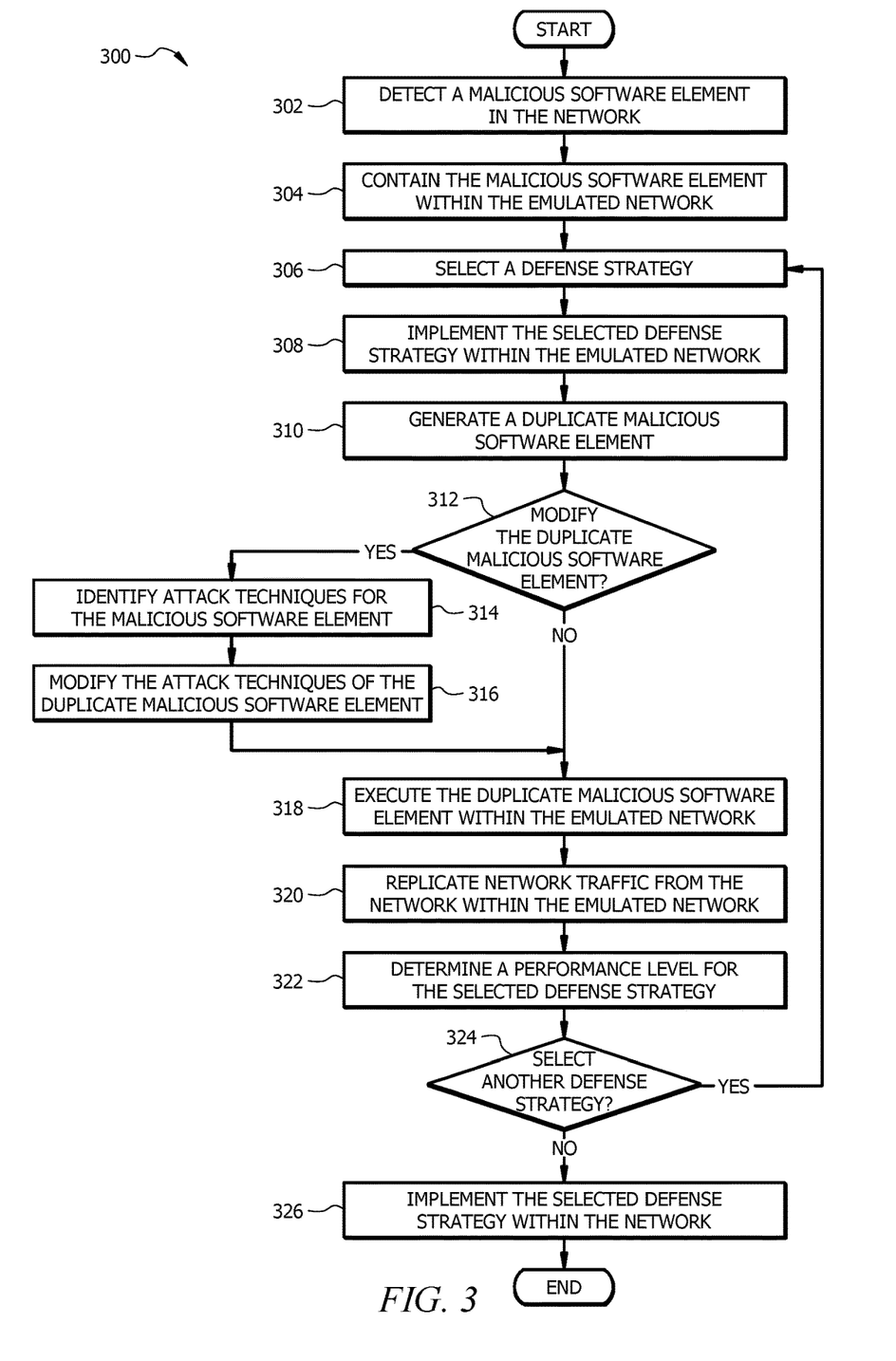
FIG. 3 is a flowchart of an embodiment of a network threat prevention method.

FIG. 3 is a flowchart of an embodiment of a threat detection method 300. Method 300 may be employed by the information security engine 104 of the network device 102 to determine a defense strategy 414 that can be implemented in the network 106 dealing with a detected malicious software element 116. The defense strategy 414 is a network configuration for preventing or mitigating attacks to the network 106 by the malicious software element 116 and similar malicious software elements 116.

At step 302, the information security engine 104 detects a malicious software element 116. The information security engine 104 monitors data transmissions by devices within the network 106 to detect when an attack occurs by a malicious software element 116. In one embodiment, the information security engine 104 may detect a malicious software element 116 using a process similar to the threat detection process described in FIG. 2. For example, the information security engine 104 may detect an attack from a malicious software element 116 that attempts to transmit data from a data resource 114 in the network 106 to an unauthorized device 118 that is located outside of the network 106. In this example, the attack may attempt to transmit a file size that exceeds a predefined limit for outgoing data transfers. As another example, the information security engine 104 may detect an attack that attempts to transmit data using a port that is blocked for outgoing data transfers. The information security engine 104 may block the data transmission attempt in response to detecting the attack.

At step 304, the information security engine 104 contains the malicious software element 116 within the emulated network 108. Here, the information security engine 104 may extract and relocate the code or files associated with the malicious software element 116 to the emulated network 108. Relocating the malicious software element 116 to a safe location (i.e. the emulated network 108) allows the behavior of the malicious software element 116 to be observed in response to various defense strategies 414 without compromising the security of the network 106.

At step 306, the information security engine 104 selects a defense strategy 414. A defense strategy 414 comprises a network configuration or port configuration for communicating data within the network 106. In one embodiment, a defense strategy 414 comprises a port configuration with settings to at least partially restrict data traffic entering or exiting one or more ports in the network 106. In this case, the defense strategy 414 protects the network 106 by blocking or limiting communications between the malicious software element 116 and other devices outside of the network 106 by adjusting the settings on one or more ports. For example, a port configuration may comprise a port setting that blocks or restricts data traffic flow for a port. As another example, a defense strategy 414 may comprise a port configuration with settings that partially restrict data traffic flow for a port. In this case, the defensive strategy 414 limits the throughput or bandwidth of the port. In some embodiments, a defensive strategy 414 comprises a port configuration with settings to restrict access to the copies of the data resources 114 that are stored in the emulated network 108. In this case, the defense strategy 414 protects the network 106 by providing access control to the data stored within a data resource 114. For example, the port configuration may comprise settings that restrict data from being accessed and/or removed from a data resource 114. In other embodiments, the defense strategy 414 may comprise any other suitable type and/or combination of network or port configurations.

In one embodiment, the information security engine 104 may select a defense strategy 414 based on the attack techniques used by the malicious software element 116. Here, the information security engine 104 may identify the attack techniques used by the malicious software element 116 within the network 106 based on information provided by an attack log 110. the information security engine 104 then may select a defense strategy 414 that corresponds with any of the identified attack techniques. As an example, the information security engine 104 may use a look-up table that associates each defense strategy 414 with one or more attack techniques for a malicious software element 116. Examples of attack techniques for the malicious software element 116 include, but are not limited to, making calls to unknown or unusual Uniform Resource Locators (URLs), making unexpected connection requests, making unusual data transfers, making unusual lateral data movement within the network 106, exploring files, manipulating data, destroying data, exfiltrating data, or performing any other type of suspicious or malicious activity.

At step 308, the information security engine 104 implements the selected defense strategy 414 within the emulated network 108. Here, the information security engine 104 configures the emulated network 108 to use the port configuration and settings identified by the selected defense strategy 414. For example, the selected defense strategy 414 may comprise a port configuration or settings that block or restrict data traffic flow on a first set of ports.

At step 310, the information security engine 104 generates a duplicate malicious software element 116. The duplicate malicious software element 116 is a copy of the malicious software element 116. For example, the information security engine 104 may generate a copy of the file, code, or script that includes the malicious software element 116. The information security engine 104 is configured to generate and use duplicate copies of the malicious software element 116 for testing various defense strategies 414. By using copies of the malicious software element 116, the information security engine 104 is able to maintain the integrity of the original malicious software element 116 for other tests and analyses. In addition, by using duplicate malicious software elements 116 the information security engine 104 is able to employ parallelism to test multiple defense strategies 414 at the same time. For example, the information security engine 104 may employ multiple processors or multiple devices that are each configured to test a different defense strategy 414 against a duplicate malicious software element 116. This approach reduces the amount of time required to test multiple defense strategies 414 which allows the information security engine 104 to respond faster to network attacks, and thereby, improves the operation of the system 100.

At step 312, the information security engine 104 determines whether to modify the malicious software element 116. In one embodiment, the information security engine 104 may prompt an operator to indicate whether to modify the malicious software element 116 before testing the selected defense strategy 414. For example, the prompt the operator about whether to modify the malicious software element 116 using a graphical interface. The operator may provide a user response using an input/output device (e.g. a mouse, a keyboard, or a touchscreen) or any other suitable technique. In this example, the user input response indicates whether to modify the malicious software element 116.

The information security engine 104 proceeds to step 314 in response to determining to modify the malicious software element 116. Here, the information security engine 104 determines whether to test the selected defense strategy 414 against an original version of the malicious software element 116 or a weakened version of the malicious software element 116. The original version of the malicious software element 116 is an unmodified version of the malicious software element 116 that is able to employ all of its attack techniques. The weakened version of the malicious software element 116 is a modified version of the malicious software element 116 that limits the malicious software element's 116 ability to use one or more of its attack techniques.

At step 314, the information security engine 104 identifies attack techniques for the malicious software element 116. Here, the information security engine 104 may identify the attack techniques used by the malicious software element 116 within the network 106 based on information provided by an attack log 110.

At step 316, the information security engine 104 modifies the attack techniques of the malicious software element 116. In one embodiment, the operator may provide a user response that provides instructions about how to modify the malicious software element 116. The information security engine 104 then uses the instructions provided by the operator to modify the malicious software element 116. For example, the information security engine 104 may modify attack techniques by removing one or more of the attack techniques. In this case, the information security engine 104 may modify the code or script of the malicious software element 116 to remove its ability to execute one or more attack techniques. As another example, the information security engine 104 may modify attack techniques by altering the behavior of one or more attack techniques. In this case, the information security engine 104 may modify the code or script of the malicious software element 116 to alter the behavior of one or more attack techniques. For instance, the information security engine 104 may modify the code of the malicious software element 116 to alter the ports used by the malicious software element 116 when attempting to exfiltrate data. In other examples, the information security engine 104 may modify attack techniques using any other suitable technique.

Returning to step 312, the information security engine 104 proceeds to step 318 in response to determining not to modify the malicious software element 116. At step 318, the information security engine 104 executes the malicious software element 116 within the emulated network 108. Here, the information security engine 104 executes or releases the malicious software element 116 within the emulated network 108 to observe how the malicious software element 116 responds to the selected defense strategy 414.

At step 320, the information security engine 104 replicates network traffic from the network 106 within the emulated network 108. For example, the information security engine 104 may mirror the network traffic within the network 106 by copying the network traffic that is currently being transmitted within the network 106 and then transmits a copy of the network traffic within the emulated network 108. This process allows the information security engine 104 to test the performance of the selected defense strategy 414 against the malicious software element 116 using a copy of actual data traffic from the network 106. Using copies of actual data traffic from the network 106 provides a more accurate representation of how well the defense strategy 414 performs compared to using an approach that uses a generic set of test data.

At step 322, the information security engine 104 determines a performance level for the selected defense strategy 414. Examples of performance levels include, but are not limited to, a processor utilization rate, a memory utilization rate, a network throughput rate, or any other suitable type of performance level. For example, the information security engine 104 may measure the throughput rate for the emulated network 108 while implementing the defense strategy 414. In this example, the performance level corresponds with the throughput rate which indicates the impact of the selected defense strategy 414 on the emulated network 108 and whether the data flow within the emulated network 108 slows down while implementing the selected defense strategy 414.

As another example, the information security engine 104 may measure a processor utilization rate and/or a memory utilization rate while implementing the defense strategy 414. In this example, the performance level corresponds with the processor utilization rate and the memory utilization rate which indicates the impact of the selected defense strategy 414 on devices within the emulated network 108 and whether the performance of these devices is reduced while implementing the selected defense strategy 414. In other examples, the information security engine 104 may measure any other suitable type and/or combination of performance metrics to determine a performance level for the selected defense strategy 414.

At step 324, the information security engine 104 determines whether to select another defense strategy 414. In one embodiment, the information security engine 104 is configured to test a predetermined number of defenses strategies 414. For example, the information security engine 104 may be configured to test five, ten, twenty, a hundred, a thousand, or any other suitable number of defense strategies 414 against the malicious software element 116. In this case, after testing the predetermined number of defense strategies 414, the information security engine 104 may select the defense strategy 414 with the highest or best performance level from among the tested defense strategies 414 to implement within the network 106.

In another embodiment, the information security engine 104 is configured to test different defense strategies 414 until a predetermined performance level is achieved. The predetermined performance level corresponds with a minimum performance level. In this case, the information security engine 104 may select the defense strategy 414 that meets or exceeds the predetermined performance level to implement within the network 106.

In another embodiment, the information security engine 104 may determine to select another defense strategy 414 in the event that the previously selected defense strategy 414 fails. For example, the information security engine 104 may select another defense strategy 414 if the malicious software element 116 is able to exfiltrate data, manipulate data, destroy data, or successfully perform any other type of malicious activity.

The information security engine 104 returns to step 306 in response to determining to select another defense strategy 414. Here, the information security engine 104 returns to step 306 to select another defense strategy 414. For example, during a first iteration, the information security engine 104 may have selected a first defense strategy 414 that comprises settings for blocking data traffic flow on a first set of ports. When the information security engine 104 returns to step 306, the information security engine 104 selects a different defense strategy 414 that comprises settings for blocking a data traffic flow on a second set of ports. The second set of ports may be completely different from the first set of ports or may include one or more ports from the first set of ports. In other examples, the defense strategy 414 may comprise any other suitable type of port configurations.

Returning to step 324, the information security engine 104 proceeds to step 326 in response to determining not to select another defense strategy 414. At step 326, the information security engine 104 implements the selected defense strategy 414 within the network 106. Here, the information security engine 104 configures the network 106 to use the port configuration and settings identified by the selected defense strategy 414. For example, the selected defense strategy 414 may comprise a port configuration or settings that block or restrict data traffic flow on one or more ports.

In one embodiment, the information security engine 104 is configured to store an association between the malicious software element 116 and the selected defense strategy 414 in a memory (e.g. memory 404). For example, the information security engine 104 may associate an identifier for the malicious software element 116 with information about the port configuration for the selected defense strategy 414. The information security engine 104 may then store the association between the malicious software element 116 and the port configuration in memory. This process allows the information security engine 104 to readily identify and implement an appropriate defense strategy 414 for the next time that the malicious software element 116 is detected within the network 106.

Network Device Hardware Configuration

Figure 4:
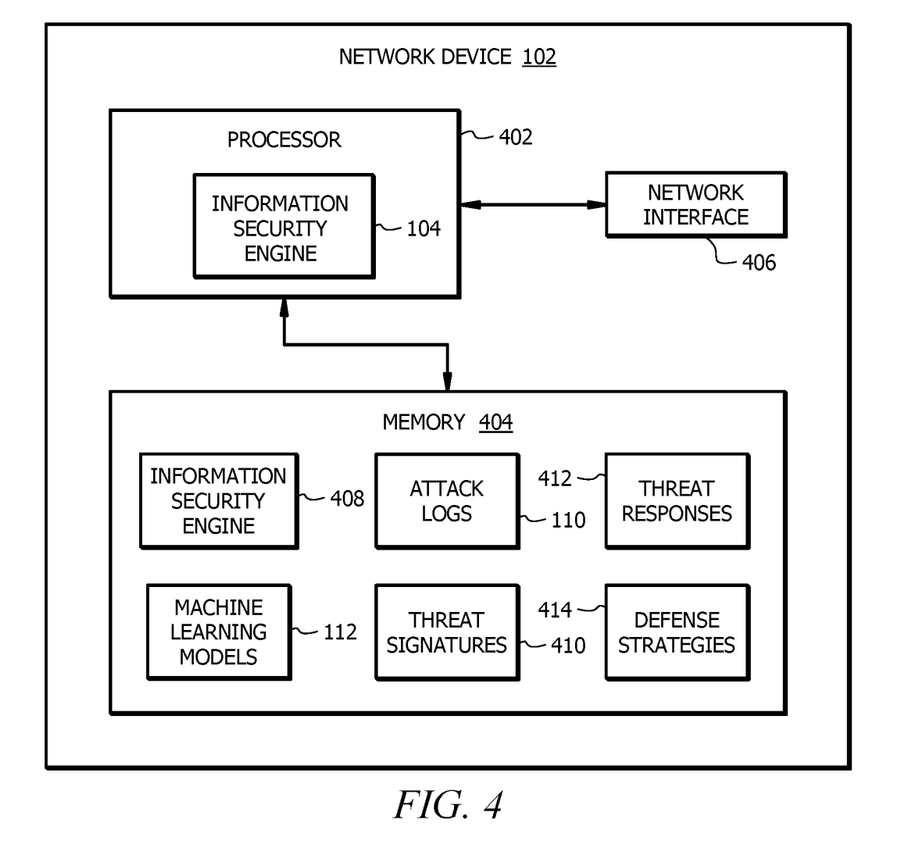
FIG. 4 is an embodiment of a device configured to provide information security using machine learning.

FIG. 4 is an embodiment of a device (e.g. network device 102) configured to provide information security using machine learning. The network device 102 comprises a processor 402, a memory 404, and a network interface 406.

The network device 102 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an information security engine 104. In this way, processor 402 may be a special-purpose computer designed to implement the functions disclosed herein. In an embodiment, the information security engine 104 is implemented using logic units, FPGAs, ASICs, DSPs, or any other suitable hardware. The information security engine 104 is configured to operate as described in FIGS. 1, 2, and 3. For example, the information security engine 104 may be configured to perform the steps of method 200 and method 300 as described in FIGS. 2 and 3, respectively.

The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The memory 404 is operable to store information security instructions 408, machine learning models 112, attack logs 110, threat signatures 410, threat responses 412, defense strategies 414, and/or any other data or instructions. The information security instructions 408 may comprise any suitable set of instructions, logic, rules, or code operable to execute the information security engine 104. The machine learning models 112, the attack logs 110, the threat signatures 410, the threat responses 412, and defense strategies 414 are configured similar to the machine learning models 112, the attack logs 110, the threat signatures 410, the threat responses 412, and the defense strategies 414 described in FIGS. 1, 2. and 3, respectively.

The network interface 406 is configured to enable wired and/or wireless communications. The network interface 406 is configured to communicate data between the network device 102 and other devices (e.g. user devices and/or network devices in the network 106), systems, or domain. For example, the network interface 406 may comprise a WIFI interface, a LAN interface, a WAN interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information security system, comprising:
a network comprising a plurality of data resources configured to store data;
an emulated network comprising copies of the plurality of data resources;
an information security engine implemented by a processor configured to:
detect an attack by a malicious software element, wherein the attack attempts to transmit a portion of data from a data resource in the network to a device located outside of the network;
transfer the malicious software element from the network to the emulated network in response to detecting the attack;
select a first defense strategy for restricting communications using a first port configuration;
implement the first defense strategy within the emulated network, wherein implementing the first defense strategy comprises replicating data traffic from the network within the emulated network;
generate a first duplicate of the malicious software element within the emulated network, wherein the first duplicate of the malicious software element is a copy of the malicious software element;
execute the first duplicate of the malicious software element in the emulated network;
determine a first performance level for the first defense strategy against the first duplicate of the malicious software element;

select a second defense strategy for restricting communication using a second port configuration, wherein the second port configuration is different from the first port configuration;
implement the second defense strategy within the emulated network, wherein implementing the second defense strategy comprises replicating data traffic from the network within the emulated network;
generate a second duplicate of the malicious software element within the emulated network, wherein the second duplicate of the malicious software element is a copy of the malicious software element;
execute the second duplicate of the malicious software element in the emulated network;
determine a second performance level for the second defense strategy against the second duplicate of the malicious software element;
compare the first performance level with the second performance level;
select one of the first defense strategy and the second defense strategy with a highest performance level based on the comparison; and
implement the selected defense strategy within the network.

2. The system of claim 1, wherein the information security engine is further configured to:
identify a plurality of attack techniques for the malicious software element based on attacks performed by the malicious software element in the network; and
wherein generating the first duplicate of the malicious software element comprises modifying one or more attack techniques of the plurality of attack techniques.

3. The system of claim 1, wherein the information security engine is further configured to:
identify a plurality of attack techniques for the malicious software element based on attacks performed by the malicious software element in the network; and
wherein generating the first duplicate of the malicious software element comprises removing one or more attack techniques of the plurality of attack techniques.

4. The system of claim 1, wherein:
the first port configuration comprises settings for blocking data traffic flow on a first set of ports from among a plurality of ports;
the second port configuration comprises settings for blocking data traffic flow on a second set of ports from among the plurality of ports; and
the second set of ports is different from the first set of ports.

5. The system of claim 1, wherein the first port configuration comprises settings for partially restricting data traffic flow for one or more ports.

6. The system of claim 1, wherein the first port configuration comprises settings for restricting access to the copies of the plurality of data resources in the emulated network.

7. The system of claim 1, wherein the information security engine is further configured to:
associate the malicious software element with a port configuration for the selected defense strategy; and
store the association between the malicious software element and the port configuration for the selected defense strategy in a memory.

8. A network threat prevention method, comprising:
detecting an attack by a malicious software element, wherein:
the attack attempts to transmit a portion of data from a data resource in a network to a device located outside of the network; and
the network comprises a plurality of data resources configured to store data;
transferring the malicious software element from the network to an emulated network in response to detecting the attack, wherein the emulated network comprises copies of the plurality of data resources in the network;
selecting a first defense strategy for restricting communications using a first port configuration;
implementing the first defense strategy within the emulated network, wherein implementing the first defense strategy comprises replicating data traffic from the network within the emulated network;
generating a first duplicate of the malicious software element within the emulated network, wherein the first duplicate of the malicious software element is a copy of the malicious software element;
executing the first duplicate of the malicious software element in the emulated network;
determining a first performance level for the first defense strategy against the first duplicate of the malicious software element;
selecting a second defense strategy for restricting communication using a second port configuration, wherein the second port configuration is different from the first port configuration;
implementing the second defense strategy within the emulated network, wherein implementing the second defense strategy comprises replicating data traffic from the network within the emulated network;
generating a second duplicate of the malicious software element within the emulated network, wherein the second duplicate of the malicious software element is a copy of the malicious software element;
executing the second duplicate of the malicious software element in the emulated network;
determining a second performance level for the second defense strategy against the second duplicate of the malicious software element;
comparing the first performance level with the second performance level;
selecting one of the first defense strategy and the second defense strategy with a highest performance level based on the comparison; and
implementing the selected defense strategy within the network.

9. The method of claim 8, further comprising:
identifying a plurality of attack techniques for the malicious software element based on attacks performed by the malicious software element in the network; and
wherein generating the first duplicate of the malicious software element comprises modifying one or more attack techniques of the plurality of attack techniques.

10. The method of claim 8, further comprising:
identifying a plurality of attack techniques for the malicious software element based on attacks performed by the malicious software element in the network; and
wherein generating the first duplicate of the malicious software element comprises removing one or more attack techniques of the plurality of attack techniques.

11. The method of claim 8, wherein:
the first port configuration comprises settings for blocking data traffic flow on a first set of ports from among a plurality of ports;

the second port configuration comprises settings for blocking data traffic flow on a second set of ports from among the plurality of ports; and the second set of ports is different from the first set of ports.

12. The method of claim 8, wherein the first port configuration comprises settings for partially restricting data traffic flow for one or more ports.

13. The method of claim 8, wherein the first port configuration comprises settings for restricting access to the copies of the plurality of data resources in the emulated network.

14. The method of claim 8, further comprising:
associating the malicious software element with a port configuration for the selected defense strategy; and
storing the association between the malicious software element and the port configuration for the selected defense strategy in a memory.

15. A computer program comprising executable instructions stored in a non-transitory computer readable medium that when executed by a processor causes the processor to:
detect an attack by a malicious software element, wherein:
the attack attempts to transmit a portion of data from a data resource in a network to a device located outside of the network; and
the network comprises a plurality of data resources configured to store data;
transfer the malicious software element from the network to an emulated network in response to detecting the attack, wherein the emulated network comprises copies of the plurality of data resources in the network;
select a first defense strategy for restricting communications using a first port configuration;
implement the first defense strategy within the emulated network, wherein implementing the first defense strategy comprises replicating data traffic from the network within the emulated network;
generate a first duplicate of the malicious software element within the emulated network, wherein the first duplicate of the malicious software element is a copy of the malicious software element;
execute the first duplicate of the malicious software element in the emulated network;
determine a first performance level for the first defense strategy against the first duplicate of the malicious software element;
select a second defense strategy for restricting communication using a second port configuration, wherein the second port configuration is different from the first port configuration;
implement the second defense strategy within the emulated network, wherein implementing the second defense strategy comprises replicating data traffic from the network within the emulated network;
generate a second duplicate of the malicious software element within the emulated network, wherein the second duplicate of the malicious software element is a copy of the malicious software element;
execute the second duplicate of the malicious software element in the emulated network;
determine a second performance level for the second defense strategy against the second duplicate of the malicious software element;
compare the first performance level with the second performance level;
select one of the first defense strategy and the second defense strategy with a highest performance level based on the comparison; and
implement the selected defense strategy within the network.

16. The computer program of claim 15, further comprising instructions that when executed by the processor causes the processor to:
identify a plurality of attack techniques for the malicious software element based on attacks performed by the malicious software element in the network; and
wherein generating the first duplicate of the malicious software element comprises modifying one or more attack techniques of the plurality of attack techniques.

17. The computer program of claim 15, further comprising instructions that when executed by the processor causes the processor to:
identify a plurality of attack techniques for the malicious software element based on attacks performed by the malicious software element in the network; and
wherein generating the first duplicate of the malicious software element comprises removing one or more attack techniques of the plurality of attack techniques.

18. The computer program of claim 15, wherein:
the first port configuration comprises settings for blocking data traffic flow on a first set of ports from among a plurality of ports;
the second port configuration comprises settings for blocking data traffic flow on a second set of ports from among the plurality of ports; and
the second set of ports is different from the first set of ports.

19. The computer program of claim 15, wherein the first port configuration comprises settings for partially restricting data traffic flow for one or more ports.

20. The computer program of claim 15, wherein the first port configuration comprises settings for restricting access to the copies of the plurality of data resources in the emulated network.

* * * * *